United States Patent
Hase

(10) Patent No.: US 10,132,304 B2
(45) Date of Patent: Nov. 20, 2018

(54) METHOD AND CONTROL CIRCUIT FOR CONTROLLING AN ELECTRICAL DRIVE OF AN ELECTRICALLY DRIVEN COMPRESSED AIR COMPRESSOR OF A MOTOR VEHICLE

(71) Applicant: MAN TRUCK & BUS AG, München (DE)

(72) Inventor: Andreas Hase, München (DE)

(73) Assignee: MAN Truck & Bus AG, Munich (DE)

( * ) Notice: Subject to any disclaimer, the term of this patent is extended or adjusted under 35 U.S.C. 154(b) by 375 days.

(21) Appl. No.: 15/168,989

(22) Filed: May 31, 2016

(65) Prior Publication Data
US 2016/0348667 A1 Dec. 1, 2016

(30) Foreign Application Priority Data
May 29, 2015 (DE) .................. 10 2015 006 988

(51) Int. Cl.
*F04B 35/04* (2006.01)
*B60K 6/445* (2007.10)
(Continued)

(52) U.S. Cl.
CPC .............. *F04B 49/06* (2013.01); *B60T 13/26* (2013.01); *F04B 27/005* (2013.01); *F04B 35/04* (2013.01); *F04C 18/16* (2013.01); *F04C 18/344* (2013.01); *F04C 28/08* (2013.01); *F04C 29/0085* (2013.01); *G05D 16/2066* (2013.01); *H02P 23/0004* (2013.01); *H02P 23/04* (2013.01); *F04B 2201/1201* (2013.01); *F04B 2201/1202* (2013.01); *F04B 2201/12041* (2013.01); *F04B 2203/0201* (2013.01);
(Continued)

(58) Field of Classification Search
CPC . F04B 35/04; H02P 23/04; B60K 6/08; B60K 6/445; G01M 1/045; B60W 20/106; B60L 15/02
See application file for complete search history.

(56) References Cited

U.S. PATENT DOCUMENTS 6,668,953 B1 * 12/2003 Reik .................. B60K 6/08
180/165
9,233,682 B2 * 1/2016 Endo .................. B60K 6/445
(Continued)

FOREIGN PATENT DOCUMENTS

DE 10 2007 011 257 9/2008
DE 102008006860 8/2009
(Continued)

OTHER PUBLICATIONS

Search Report dated Oct. 27, 2016 which issued in the corresponding European Patent Application No. 16000917.1.

*Primary Examiner* — Yuri Kan
(74) *Attorney, Agent, or Firm* — Cozen O'Connor

(57) ABSTRACT

A method for controlling an electrical drive of an electrically driven air compressor of a motor vehicle and a corresponding control circuit. A prevailing load torque of the air compressor that is applied at a drive shaft of the compressed air compressor is estimated as a function of at least one operating parameter and is fed forward as an estimated disturbance variable to the control circuit of the electrical drive to reduce a control error produced as a result of the prevailing load torque.

10 Claims, 3 Drawing Sheets

(51) Int. Cl.
  *B60L 15/02* (2006.01)
  *F04B 49/06* (2006.01)
  *H02P 23/04* (2006.01)
  *B60T 13/26* (2006.01)
  *F04B 27/00* (2006.01)
  *F04C 18/16* (2006.01)
  *F04C 18/344* (2006.01)
  *F04C 28/08* (2006.01)
  *F04C 29/00* (2006.01)
  *H02P 23/00* (2016.01)
  *G05D 16/20* (2006.01)

(52) U.S. Cl.
  CPC ............... *F04B 2203/0207* (2013.01); *F04B 2203/0209* (2013.01); *F04C 2240/40* (2013.01); *F04C 2240/60* (2013.01); *F04C 2270/035* (2013.01); *F04C 2270/605* (2013.01); *F05B 2210/12* (2013.01); *F05B 2270/335* (2013.01); *F05B 2270/70* (2013.01)

(56) References Cited

U.S. PATENT DOCUMENTS

| | | | |
|---|---|---|---|
| 2004/0003661 A1* | 1/2004 | Rothamel | G01M 1/045 73/462 |
| 2006/0125437 A1* | 6/2006 | Kitano | F04B 35/04 318/432 |
| 2008/0116832 A1* | 5/2008 | Yamada | B60L 15/02 318/460 |
| 2011/0234144 A1* | 9/2011 | Maekawa | H02P 23/04 318/702 |

FOREIGN PATENT DOCUMENTS

| | | |
|---|---|---|
| DE | 10 2011 053 568 | 3/2013 |
| EP | 1 749 685 | 2/2007 |
| EP | 2 023 480 | 2/2009 |
| JP | 2006-180605 | 7/2006 |

* cited by examiner

METHOD AND CONTROL CIRCUIT FOR CONTROLLING AN ELECTRICAL DRIVE OF AN ELECTRICALLY DRIVEN COMPRESSED AIR COMPRESSOR OF A MOTOR VEHICLE

BACKGROUND OF THE INVENTION

1. Field of the Invention

The invention relates to a method for controlling an electrical drive of an electrically driven compressed air compressor of a motor vehicle and a corresponding control circuit.

2. Description of the Related Art

It is known from practice to provide compressed air compressors, so-called air compressors, to supply pneumatic braking systems in commercial vehicles, wherein said air compressors function according to the reciprocating piston principle. Depending upon the application purpose, it is necessary to provide for hybrid-electrical commercial vehicles, in other words commercial vehicles that are equipped with a hybridized drive train, air compressors that are driven at least in part in an electrical manner, said air compressors also being referred to in short as "e-AC". The electrical drive of an electrically driven compressed air compressor can comprise a frequency converter and an electric motor, wherein the electric motor can be embodied as an asynchronous machine, synchronous machine, or a reluctance machine.

However, air compressors that are based in particular on the reciprocating piston technique have load torques that have high peaks and non-linear fluctuations for which the electrical drive must compensate. Even in the case of constant pressure loadings at the air compressor outlet connection, the torque changes greatly in a non-linear manner during a full rotation of the crank shaft. This leads to high power losses, especially in continuous operation. Further disadvantages are represented by the required high magnitude of electrical energy reserve, in particular for starting the motor of the air compressor, and the high cooling requirements, for example in the case of a slow motor start-up in the presence of a high torque of an air-cooled asynchronous machine. This leads to greater expenditure and higher costs relating to the performance electronics and the motor, for example in relation to the thermal behaviour and current capability.

SUMMARY OF THE INVENTION

It is consequently an object of one aspect of the invention to provide an improved electrical drive or an improved operating method for an electrical drive of an electrically driven compressed air compressor, with which it is possible to avoid the disadvantages of conventional techniques.

In accordance with a first aspect of the invention, a method is provided for controlling an electrical drive of an electrically driven compressed air compressor of a motor vehicle. The motor vehicle is preferably embodied as a commercial vehicle, and the compressed air compressor is preferably provided to supply a pneumatic compressed air system, in particular a pneumatic compressed air braking system.

In accordance with one aspect of the invention, a prevailing load torque of the compressed air compressor that is applied at a drive shaft of the compressed air compressor that is driven by the electrical drive is estimated as a function of at least one operating parameter and is fed forward as an estimated disturbance variable to the control circuit of the electrical drive so as to reduce a control error that is produced as a result of the prevailing load torque. The estimated load torque that is currently applied at the drive shaft of the compressed air compressor is fed forward as a function of at least one operating parameter as an estimated disturbance variable to the control circuit of the electrical drive such that the control error that is produced in the control circuit as a result of the load torque characteristic is reduced, preferably minimized and as a consequence the dynamics of the electrical drive are increased.

The feedforward of the disturbance variable of the drive shaft load torque for the machine control renders it possible to reduce the control error, in particular for the rotational speed and the electrical current in the motor control, and to minimize peaks and fluctuations in the motor phase current or motor torque. Further advantages reside in the reduction of the electrical power losses and electrical power reserves in the frequency converter and in the reduction in the mechanical loading for the compressed air compressor and motor.

In accordance with a preferred embodiment, the prevailing load torque of the compressed air compressor applied at the drive shaft of the air compressor is estimated as a function of at least one of the following variables: a prevailing angle position of the drive shaft of the compressed air compressor; a prevailing rotational speed of the drive shaft of the compressed air compressor, which is provided by a motor rotational speed of the electrical drive; and a prevailing value of a pressure parameter from which a prevailing value of an air pressure that is applied at the outlet connection of the compressed air compressor can be derived or can be estimated and/or which indicates a measurement for a counter pressure that is generated by an air system that is coupled to the compressed air compressor.

These three operating parameters are the main cause of fluctuations in the load torque generated by the air compressor at the drive shaft of the air compressor, said drive shaft being driven by the electrical drive, and are consequently particularly advantageous for estimating the load torque.

In accordance with a particularly preferred embodiment, the prevailing load torque of the air compressor applied at the drive shaft of the air compressor is estimated by using at least these three operating parameters, in other words is estimated as a function of the prevailing angle position of the drive shaft, the prevailing rotational speed of the drive shaft, and the prevailing value of the pressure parameter. This renders it possible to estimate in a particularly precise manner the disturbance variable and consequently to particularly greatly reduce the control error.

The function for estimating the prevailing load torque of the compressed air compressor that is applied at the drive shaft of the compressed air compressor can be stored as a characteristic field, by way of example as a matrix characteristic field, wherein the characteristic field is determined in advance by measuring the load torque in dependence upon the operating parameters.

One possibility of achieving the object in accordance with the invention provides that the control circuit for an electrical current control (current control circuit) of the electrical drive is influenced by the estimated disturbance variable. In particular, the estimated disturbance variable can be inverted with the transformation function of the current control circuit and added to a correcting variable of a rotational speed controller of the electrical drive and as a consequence can be fed forward to the control circuit for the electrical current control of the electrical drive.

The resulting estimated variable (estimated disturbance variable) is added by way of the inverse transformation function of the current control circuit to a correcting variable of the rotational speed controller of the electrical drive and as a consequence fed forward to the control circuit for the electrical current control of the electrical drive.

One particular advantage of achieving the object in this manner resides in the fact that the air pressure compressor is measured independently and the characteristic field that is derived therefrom for the estimated variable can be used with any desired electric motor and frequency converter. Consequently, no further requirements are placed on the sensor system by the electric motor and frequency converter with the operation during which the rotational speed is controlled. Furthermore, the known, non-linear behaviour of the air compressor can occur and be controlled to a great extent in a relatively simple manner. It is not necessary to provide a detailed, costly model of the mechanical control path from the internal construction of the air compressor—this would represent an essentially greater expenditure relating to the computing performance and real time ability of the hardware and software to perform the control—as a consequence of which the additional costs are reduced for the implementation for the controller whilst improving the functionality.

To increase the accuracy of the estimation of the load torque further, the prevailing load torque of the compressor that is applied at the drive shaft of the compressor can be estimated in accordance with a further embodiment variant furthermore as a function of at least one of the following variables: a frictional torque of the reciprocating piston, wherein the air compressor is embodied as a reciprocating compressed air compressor; an ambient temperature of the air, and a cooling medium temperature of a cooling medium of a cooling circuit of the air compressor.

The air compressor can be embodied as a reciprocating piston compressed air compressor that comprises by way of example one or two cylinders. In the case of air compressors that function according to the reciprocating piston principle, the fluctuations in load torque are particularly great. However, the method in accordance with the invention can also be used for other compressor technologies. Thus, the air compressor can also be embodied as a screw compressed air compressor (so-called Scroll principle) or as a vane cell compressed air compressor.

In accordance with a further preferred embodiment, a frequency converter is operated so as to control the electrical drive with a field-oriented vector control that can be performed with and without a rotational speed sensor. It is necessary to measure the current in order to estimate the disturbance variable and to implement the control method or control circuit in accordance with the invention. In order to further implement a sensorless, field-oriented vector control, a corresponding demand for accuracy of the current measurement is required; however, costs for the sensor or for separate sensors for determining the angle position and rotational speed of the drive shaft are avoided.

The invention is not limited to a specific construction with respect to the structural design of the electrical machine of the electrical drive. The electrical machine can be embodied as an asynchronous machine, a synchronous machine, a reluctance machine, or a direct current machine.

In accordance with one aspect of the invention, a control circuit is provided for controlling an electrical drive of an electrically driven air compressor of a motor vehicle. In accordance with one aspect of the invention, the control circuit is embodied so as to perform the method for controlling the electrical drive as described in this document. In particular, the control circuit is configured to estimate a prevailing load torque of the compressor that is applied at a drive shaft of the compressor and is estimated as a function of at least one operating parameter, and to forward feed said variable as an estimated disturbance variable to the control circuit of the electrical drive in such a manner that a control error that is produced as a result of the prevailing load torque is reduced. To avoid repetitions, features that are disclosed only in accordance with the device are also to be regarded as disclosed in accordance with the method and can be claimed and consequently are also valid for the control circuit.

Moreover, the invention relates to a motor vehicle, in particular a commercial vehicle having an electrically driven air compressor configured to supply a pneumatic compressed air braking system and such a control circuit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The previously described preferred embodiments and features of the invention can be combined in any desired manner with one another. Further details and advantages of the invention are described hereinunder with reference to the attached drawings. In the figures.

DETAILED DESCRIPTION OF THE PRESENTLY PREFERRED EMBODIMENTS

Figure 1:
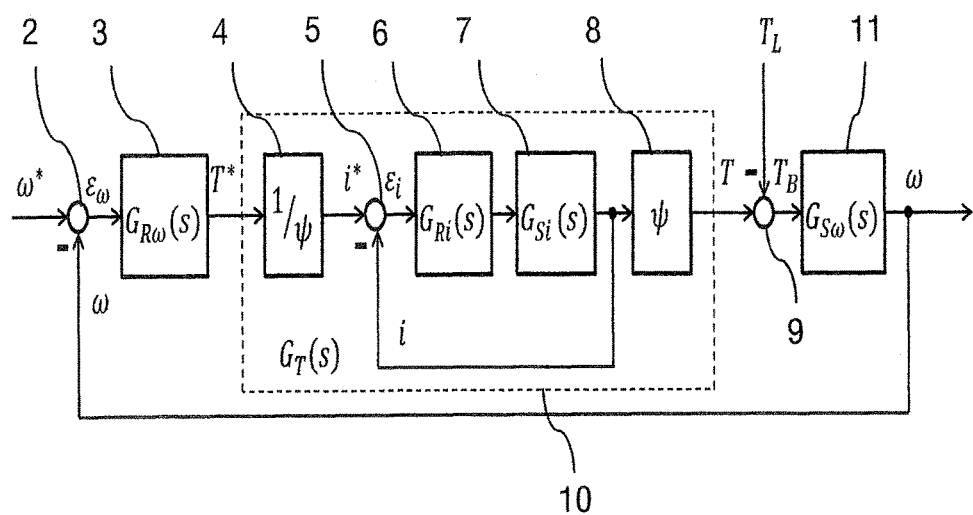
FIG. 1 is an equivalent circuit diagram or model in Laplace space of a control circuit without feedforward of the disturbance variable.

In the described exemplary embodiment, the electrically driven air compressor is embodied by way of example as a two-cylinder reciprocating piston air compressor. The electrical drive comprises an electrical machine that drives the crank shaft (drive shaft) of the air compressor. The air compressor and the crank shaft that can be embodied in a known manner. The principle of the control method and of the control circuit is explained with reference to controlling an electrical machine embodied as a direct current machine. For this purpose, FIG. 1 illustrates an equivalent circuit diagram and model in Laplace space of the control circuit or the control path for illustrating the control of the armature current and motor rotational speed. FIG. 1 illustrates the control circuit initially without the disturbance variable having been fed forward in accordance with the invention and this is subsequently explained with reference to FIG. 2.

FIG. 1 illustrates a cascade circuit for embodying a rotational speed-controlled and current-controlled control circuit or controller (cascade control). The control principle is used primarily for controlling the electrical drive of the air compressor. The controller can be embodied by way of example as a PID-, PD- or PI-controller.

Figure 2:
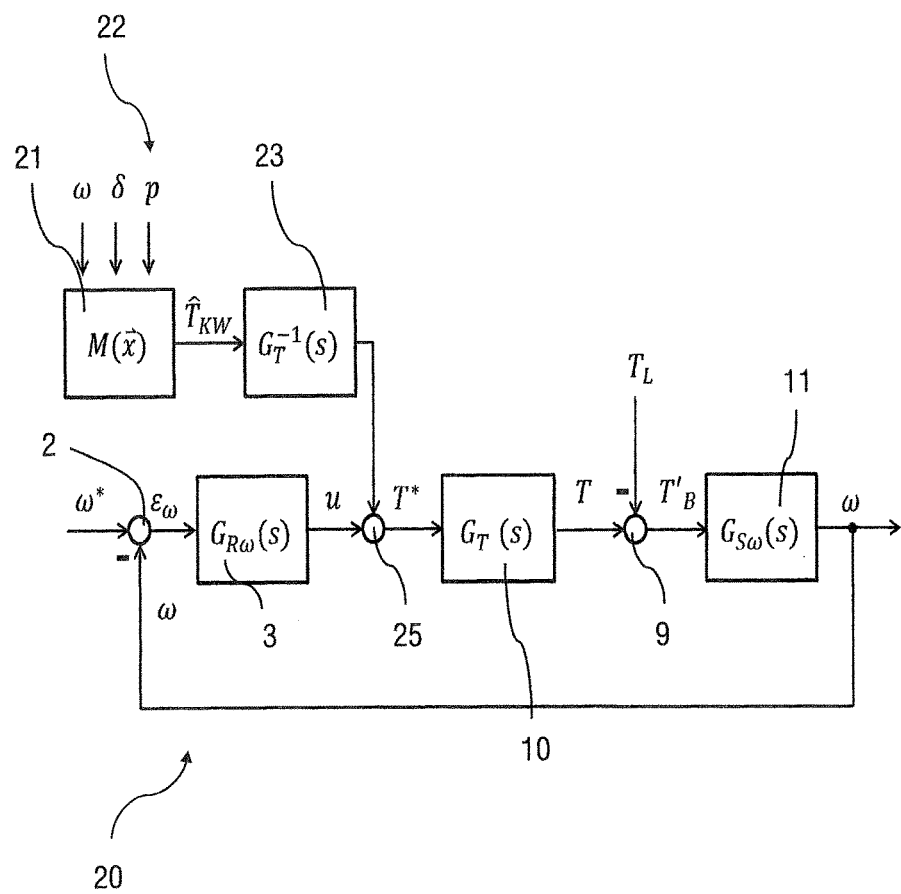
FIG. 2 is an equivalent circuit diagram or model in Laplace space of a control circuit where the disturbance variable has been fed forward.

Desired variables are identified in FIG. 1 and in FIG. 2 by an asterisk "*".

The cascade circuit comprises an outer control circuit that includes the rotational speed controller 3 and the control path 11 for the modelled mass moment of inertia of the air compressor, which are illustrated in FIG. 1 as the transformation function G_Rω(S) and G_Sω(S). In so doing, the rotational speed controller 3 is influenced by the rotational speed control error δ_ω, in other words the difference formed in the comparator 2 from the prevailing desired rotational speed ω* and actual specific prevailing rotational speed ω of the drive shaft. The rotational speed controller 3 determines therefrom a correcting variable in the form of a desired torque T*, with which the inner control circuit 10 of the cascade connection is influenced.

The inner control circuit 10 (in FIG. 1 and FIG. 2 also identified as G_T(S) is used for the electric current control of the electrical drive. The aim of this control is as is known to set a predetermined current in the machine and to eliminate disturbances in the operating voltage. A subordinate current control so as to improve the rotational speed control is essentially used in order to prevent the influence of the electromotive force (EMF) that is directed in the opposite direction. The reference number 8 in FIG. 1 identifies the transformation function ψ of the constant for the electromotive force (EMF) with the reference numeral 4 corresponding to the transformation function 1/ψ. The transformation function 1/ψ calculates the desired current i* from the desired torque T*.

The comparator 5 calculates the current control error ε_i by forming the difference between the desired current i* and the actual determined current i of the direct current machine. The current controller 6 illustrated in this figure as the transformation function G_Ri(S), is influenced by the current control error ε_i and calculates a corresponding correcting variable for the control path 7 for the current circuit of the electrical machine (in FIG. 1 illustrated as the Laplace transformation function G_Si(S)).

The variable T_L describes the load torque at the electrical machine or the crank shaft torque of the air compressor that represents a disturbance behaviour for the control circuit. The greater the fluctuation in the disturbance variable T_L, the greater the control error of the control circuit and thus the greater the fluctuation of the variable T_B and consequently the greater the torque that must be compensated for by the control path G_Sω(S).

The load torque on the E-machine T_L or the crankshaft torque of the air compressor is composed of multiple components:
  a first component that indicates the torque T_KW=f (δ_KW, ω, p) as a function dependent upon the crank shaft angle position δ, the rotational speed ω and the pressure p in the compressed air system;
  a second torque component T_Ö, that results from the operation of an oil pump of the compressed air compressor, and an unknown residual component T_Rest.

$$T\_L = T\_KW + T\_\ddot{O} + T\_Rest \quad \text{(Formula 1):}$$

wherein the first component T-KW represents the by far greatest component.

The control model that is illustrated in FIG. 1 is therefore further developed, in that the prevailing load torque T_L of the air compressor that is applied at a drive shaft of the air compressor is estimated as a function of at least one operating parameter and is fed forward as an estimated disturbance variable to the control circuit of the electrical drive such that the control error that is produced as a result of the applied load torque is reduced. Primarily, only the first component T_KW is estimated for the feedforward of the disturbance variable. The estimated variable for T_KW is described hereinunder by T^_KW. An estimation of T^_KW of the torque T_KW is performed by way of a matrix characteristic field (21), on the basis of characteristic curves of measurements that are initially performed in an experimental manner at the air compressor.

In the present exemplary embodiment, the progression has been measured in dependence upon the prevailing angle position δ of the drive shaft of the air compressor, the prevailing rotational speed ω of the drive shaft of the air compressor, which is predetermined by a motor rotational speed of the electrical drive, and the prevailing value of a pressure parameter p from which an actual value of an air pressure that is prevailing at the outlet connection of the air compressor is derived or can be estimated and/or that indicates a measurement for a counter pressure that is generated by a compressed air system that is coupled to the air compressor.

Figure 3:
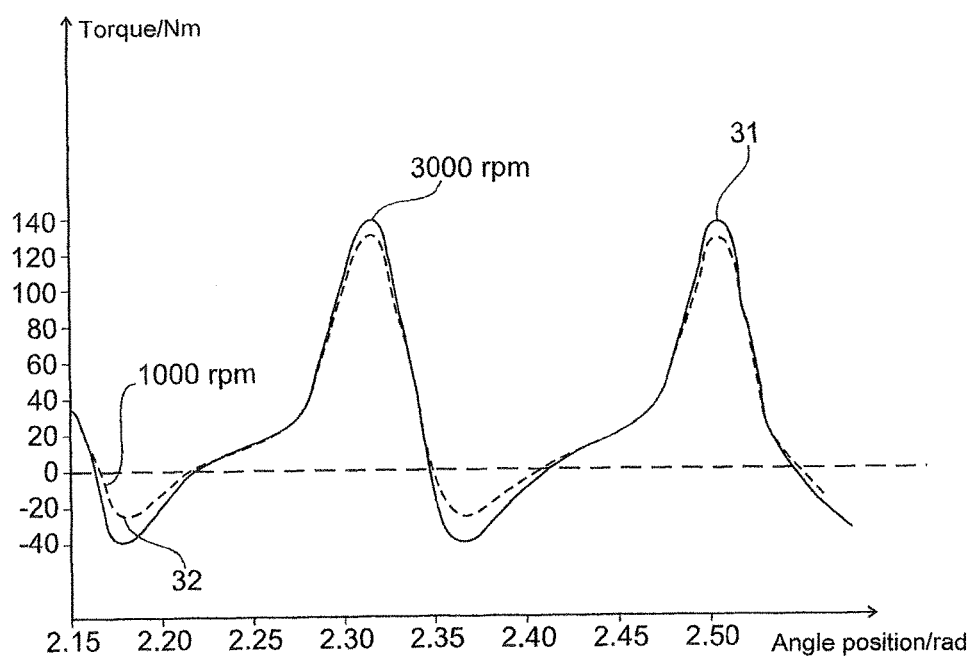
FIG. 3 is a characteristic curve function of a load torque of a reciprocating air compressor.

The progression of the load torque T_KW that is applied at the crankshaft of a two cylinder reciprocating air compressor, the crankshaft being driven by the electrical drive, is illustrated by way of example in FIG. 3 as a function of the angle position δ to the crankshaft.

The curve 31 with the continuous line indicates the angle position-dependent progression of the load torque for a rotational speed ω of 3000 rotations per minute, whereas the curve 32 with the dash-dotted line indicates the angle position-dependent progression of the load torque for a rotational speed ω of 1000 rotations per minute. As is evident in FIG. 3, the torque is greatly dependent upon the pressure build up in the reciprocating piston or the angle of the crankshaft (KW). Even in the case of constant pressure loadings at the outlet connection of the compressed air compressor, the torque changes in a greatly non-linear manner during a full rotation of the crankshaft and fluctuates in part up to 180 Nm in the present example. The dynamics depend directly on the drive rotational speed which is illustrated by way of example by the different progressions 31 and 32. To simplify the illustration, the dependency of the load torque upon the pressure parameter p is not illustrated in FIG. 3. Moreover, the rotational speed dependency of the load torque is indicated in FIG. 3 likewise only by way of example with reference to two values of the rotational speed parameter ω, wherein however the characteristic curve of the entire rotational speed range of the electrical motor is measured and stored.

Without compensation, the control of these fluctuations in the motor and converter of the electrical drive lead to high power losses, above all in the continuous operation. Moreover, it is necessary to keep a high magnitude of reserve power, in particular for starting up the motor of the air compressor. Finally, the cooling requirements increase, for example with regard to a quicker start-up of the motor of an air-cooled ASM. This leads to greater effort and higher costs relating to the performance electronics and the motor, (thermal behaviour and current capability).

However, in the case of a constant air pressure at the outlet connection of the air compressor, the progression of the load torque T_L of a reciprocating piston air compressor repeats periodically after each full rotation of 360° and can thus be predicted by using the characteristic curve(s) 31, 32. The pressure at the outlet connection or in the compressed air tank has an essentially slower time constant and changes only slightly during many hundred rotations. In the case of an operation of a commercial vehicle, it is possible to use by way of example the prevailing pressure measurement of the compressed air tank to determine the compressed air parameter p.

FIG. 2 illustrates the further development of the control model of FIG. 1. Corresponding components are described by identical reference numerals to those relating to the components in FIG. 1 and are not described separately. The special feature of the control method in accordance with the invention and the difference with respect to FIG. 1 reside as already mentioned above in the fact that by a matrix characteristic field 2 the prevailing load torque of the air compressor that is applied at the drive shaft of the air compressor is estimated in the form of the variable $T\hat{\ }\_KW$ .

For this purpose, the prevailing values 22 of the operating parameters $\delta$, $\omega$, p are continuously determined and estimated with reference to the stored characteristic matrix 21 of the prevailing value for the load torque T_KW. The resulting estimated variable $T\hat{\ }\_KW$ is added by way of the inverse transformation function $G^{-1}\_T(s)$ of the current control circuit 10 to a correcting variable u of the rotational speed controller 3 of the electrical drive and as a consequence is fed forward to the control circuit 10 for the electrical current control of the electrical drive. The feedforward of the disturbance variable is thus used to control the load that is applied at the electrical drive.

Consequently, a correcting variable that corresponds to a torque T is produced as an output variable of the inner control circuit (current control circuit) 10.

$$T=G\_T*u+T\hat{\ }\_KW, \quad \text{(Formula 2)}$$

wherein G_T represents the transformation function of the current control circuit 10 and u represents the correcting variable of the rotational speed controller 3. The symbol "*" describes a multiplication in Laplace space (no convolution).

As a result, the variable $T''\_B$ is produced as an input variable $T\_B$ of the control path $G\_S\omega(S)$ 11:

$$T'\_B=T-T\_L=G\_T*u-T\_R-T\_\ddot{O}-\Delta T, \quad \text{(Formula 3)}$$

wherein $\Delta T=T\_KW-T\hat{\ }\_KW$, corresponds therefore to the estimated error of the crankshaft torque.

Without the feedforward of the disturbance variable, T_B is produced in accordance with the arrangement in FIG. 1:

$$T\_B=T-T\_L=G\_T*u-T\_R-T\_\ddot{O}-T\_KW, \quad \text{(Formula 4)}$$

By virtue of less intervention in the control circuit by $\Delta T$ with respect to T_KW, it is possible to reduce the control errors $\varepsilon\_\omega$ and $\varepsilon\_i$ and to increase the quality of the control process.

The feedforward of the disturbance variable of the drive shaft load torque for the machine control renders it possible to reduce the control error, in particular for the rotational speed and the electrical current in the motor control, and to minimize peaks and fluctuations in the motor phase current or motor torque. Further advantages reside in the reduction of the electrical power losses and electrical power reserves in the frequency converter and in the reduction in the mechanical loading for the air compressor and motor.

Although the invention is described with reference to specific exemplary embodiments, it is evident to a person skilled in the art that different changes can be performed and equivalents used as alternatives without departing from the scope of the invention. In addition, numerous modifications can be performed without departing from the associated scope. It is thus possible for example to interpret and estimate the known crankshaft variable differently to the rotational speed and to feedforward this at a different location in the control circuit. As a consequence, the invention is not to be limited to the disclosed exemplary embodiments but rather is to include all exemplary embodiments that fall into the scope of the attached claims. In particular, the invention also claims protection for the subject matter and the features of the subordinate claims independently from the referenced claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling an electrical drive of an electrically driven air compressor of a motor vehicle, comprising:
    estimating a prevailing load torque of the air compressor applied at a drive shaft of the air compressor based at least in part on at least one operating parameter; and
    feedforward the estimated prevailing load torque as an estimated disturbance variable to a control circuit of the electrical drive to reduce a control error produced based at least in part on the prevailing load torque.

2. The method according to claim 1, wherein the prevailing load torque of the air compressor that is applied at the drive shaft of the air compressor is estimated based at least in part on at least one of:
    (a) a prevailing angle position ($\delta$) of the drive shaft of the air compressor,
    (b) a prevailing rotational speed ($\omega$) of the drive shaft of the air compressor that is predetermined by a motor rotational speed of the electrical drive,
    (c) a prevailing value of a pressure parameter (p), from which an actual value of an air pressure applied at an outlet connection of the air compressor can be derived or estimated, and
    (d) a prevailing value of a pressure parameter (p) that indicates a measurement for a counter pressure that is generated by a compressed air system coupled to the air compressor.

3. The method according to claim 2, wherein the prevailing load torque of the air compressor that is applied at the drive shaft of the air compressor is estimated based at least in part on the prevailing angle position ($\delta$) of the drive shaft, the prevailing rotational speed ($\omega$) of the drive shaft, and the prevailing value of the pressure parameter (p).

4. The method according to claim 2, wherein a function to estimate the prevailing load torque is stored as a characteristic field.

5. The method according to claim 1, wherein at least one of:

(a) a control circuit for an electrical current control of the electrical drive is influenced by an estimated disturbance variable; and
(b) the estimated disturbance variable is inverted with a transformation function of a control circuit for an electrical current control of the electrical drive and is added to a correcting variable (u) of a rotational speed controller of the electrical drive and as a consequence is fed forward to the control circuit for an electrical current control of the electrical drive.

6. The method according to claim 1, wherein the air compressor is embodied as one of a reciprocating piston air compressor, a screw air compressor, and a vane cell air compressor.

7. The method according to claim 1, wherein the prevailing load torque of the compressor applied at the drive shaft of the compressor is estimated as a function of at least one of:
(a) a frictional torque of a reciprocating piston, wherein the air compressor is embodied as a reciprocating air compressor;
(b) an ambient air temperature; and
(c) a cooling medium temperature of a cooling medium of a cooling circuit of the air compressor.

8. The method according to claim 1, wherein at least one of:
(a) a frequency converter is operated to control the electrical drive with a field-oriented vector control; and
(b) the electrical drive comprises an electrical machine that is embodied as one of an asynchronous machine, a synchronous machine, a reluctance machine, and a direct current machine.

9. A control circuit for controlling an electrical drive of an electrically driven air compressor of a motor vehicle, wherein the control circuit is configured to:
(a) estimate a prevailing load torque of the compressor that is applied at a drive shaft of the compressor as a function of at least one operating parameter and
(b) feedforward the estimated load torque as an estimated disturbance variable to the control circuit of the electrical drive to reduce a control error that is produced as a result of the prevailing load torque.

10. A motor vehicle, comprising:
an electrically driven air compressor configured to supply a pneumatic compressed air braking system in a commercial vehicle; and
control circuit is configured to:
(a) estimate a prevailing load torque of the compressor that is applied at a drive shaft of the compressor as a function of at least one operating parameter; and
(b) feedforward the estimated load torque as an estimated disturbance variable to the control circuit of the electrical drive to reduce a control error that is produced as a result of the prevailing load torque.

* * * * *